United States Patent [19]

Dehennau et al.

[11] Patent Number: 4,695,506
[45] Date of Patent: Sep. 22, 1987

[54] RIGID AND SEMIRIGID THERMOPLASTIC STRUCTURES WITH MULTIPLE COEXTRUDED POLYMERIC LAYERS INCORPORATING AN INNER VINYLIDENE CHLORIDE COPOLYMER LAYER AND USE OF THESE STRUCTURES FOR THE MANUFACTURE OF PACKAGES

[75] Inventors: Claude Dehennau, Waterloo; Yannick Vandendael, Braine-l'Alleud, both of Belgium

[73] Assignee: Solvay & Cie. (Societe Anonyme), Brussels, Belgium

[21] Appl. No.: 755,904

[22] Filed: Jul. 17, 1985

[30] Foreign Application Priority Data

Jul. 19, 1984 [FR] France ................... 84 11630

[51] Int. Cl.$^4$ ............................... B32B 7/02
[52] U.S. Cl. ................... 428/212; 428/520; 428/522
[58] Field of Search .............. 428/522, 520, 212; 156/244.11

[56] References Cited

FOREIGN PATENT DOCUMENTS

| 457072 | 12/1974 | Australia . | |
|---|---|---|---|
| 508885 | 1/1955 | Canada | 428/522 |
| 95526 | 12/1983 | European Pat. Off. . | |
| 1417500 | 10/1965 | France . | |
| 2162547 | 7/1973 | France . | |
| 165253 | 10/1982 | Japan | 428/522 |
| 250040 | 12/1985 | Japan | 428/522 |
| 1146647 | 3/1969 | United Kingdom . | |
| 1456753 | 5/1976 | United Kingdom . | |
| 2078620 | 1/1982 | United Kingdom | 428/522 |

*Primary Examiner*—Edith Buffalow
*Attorney, Agent, or Firm*—Spencer & Frank

[57] ABSTRACT

The thermoplastic structures incorporate an inner vinylidene chloride copolymer layer, each face of which is bonded to a vinyl chloride polymer (2) layer through the intermediacy of a separate intermediary vinyl chloride polymer (1) layer whose gel temperatrue and dynamic viscosity are lower than those of the adjacent vinyl chloride polymer (2).

The thermoplastic structures with multiple coextruded polymeric layers may be in the form of sheets, plaques, tubes or rigid or semirigid hollow bodies, which can be employed in the field of packaging.

9 Claims, No Drawings

RIGID AND SEMIRIGID THERMOPLASTIC STRUCTURES WITH MULTIPLE COEXTRUDED POLYMERIC LAYERS INCORPORATING AN INNER VINYLIDENE CHLORIDE COPOLYMER LAYER AND USE OF THESE STRUCTURES FOR THE MANUFACTURE OF PACKAGES

BACKGROUND OF THE INVENTION

Field of the Invention

The present invention relates to rigid and semirigid thermoplastic structures with multiple coextruded polymeric layers incorporating an inner vinylidene chloride copolymer layer, and to the use of these structures for the manufacture of packages.

Description of the Background

It is well known to improve the gas and vapour impermeability of various packages made of bulk thermoplastic polymers by combining them with a vinylidene chloride copolymer in a structure with multiple polymeric layers. Coextrusion, that is to say simultaneous extrusion through a single die, is an application method which is particularly suitable for combining various layers of thermoplastic polymers in a single operation. However, owing to the relative thermal instability of vinylidene chloride copolymers, the latter usually form an inner layer of the coextruded multilayer structures.

In Belgian Patent 777,943 (the Dow Chemical Co.), a description is given of rigid thermoplastic structures with five coextruded polymeric layers comprising a central vinylidene chloride polymer layer, outer layers of polyvinyl chloride and intermediate adhesive layers of a copolymer of ethylene and vinyl acetate.

It has now been found that the delamination resistance of multilayer structures of the prior art is not optimal and, furthermore, that it deteriorates considerably after a period of residence in boiling water.

SUMMARY OF THE INVENTION

The present invention aims to provide new rigid and semirigid thermoplastic structures with multiple coextruded polymeric layers incorporating an inner vinylidene chloride copolymer layer attached on both sides to a layer of vinyl chloride polymer through the intermediacy of a polymeric layer, which have an improved delamination resistance which does not deteriorate after a period of residence in boiling water.

To this end, the invention provides rigid and semirigid thermoplastic structures with multiple coextruded polymeric layers incorporating an inner vinylidene chloride layer, each face of which is bonded to a layer of vinyl chloride polymers (2) having a gel temperature not exceeding 190° C. and a dynamic viscosity at 180° C. and 1 sec$^{-1}$ not exceeding 2 10$^5$ Pa s through the intermediacy of a separate intermediary layer of vinyl chloride polymer (1) whose gel temperature and dynamic viscosity measured at 180°°C. and 1 sec$^{-1}$ are lower than those of the adjacent vinyl chloride polymer (2).

DESCRIPTION OF THE PREFERRED EMBODIMENT

The thermoplastic structures with multiple coextruded polymeric layers according to the invention thus incorporate at least five layers, namely an inner vinylidene chloride copolymer layer provided on each of its two faces with two separate layers of vinyl chloride polymers (1) and (2). It will be understood that the vinyl chloride polymers (1) and (2) coextruded onto one face of the vinylidene chloride copolymer layer need not necessarily be identical to the vinyl chloride polymers (1) and (2) coextruded onto the opposite face of the vinylidene chloride copolymer layer. Nevertheless, preference is given to thermoplastic structures incorporating five coextruded layers in which the vinyl chloride polymers (1) and (2) are identical on both sides of the vinylidene chloride copolymer layer.

It is also to be understood that the multilayer structures according to the invention may incorporate additional layers such as, for example, layers consisting of polymeric scrap originating from recycling or, similarly, additional layers of thermoplastic polymers other than vinyl chloride polymers.

The invention thus lies substantially in resorting, as an intermediary layer between a vinylidene chloride copolymer layer and a coextruded layer of vinyl chloride polymer (2), to a vinyl chloride polymer (1) whose gel temperature and dynamic viscosity measured at 180° C. and 1 sec$^{-1}$ are lower than those of the adjacent vinyl chloride polymer (2). The layer of vinyl chloride polymer (1) acts both as an adhesion layer and as a thermal buffer for the vinylidene chloride copolymer.

Gel temperature and dynamic viscosity of the polymers forming the multilayer complexes according to the invention are understood to refer to the gel temperature and the dynamic viscosity of the compositions based on these polymers which are in fact employed for coextrusion, that is to say polymers containing all the components effectively employed in use, such as lubricants, plasticizers, heat stabilizers, fillers, pigments and the like. In the case where the polymers contain plasticizers, the quantity of plasticizer will not exceed 30% by weight and, preferably, 10% by weight.

The preferred multilayer structures are those in which the vinyl chloride polymer (1) forming the intermediary layer has a gel temperature not exceeding 180° C. and a dynamic viscosity at 180° C. and 1 sec$^{-1}$ ($\eta_1$) not exceeding 8 10$^4$ Pa s.

Multilayer structures which are particularly preferred are those in which the vinyl chloride polymer (1) has a gel temperature not exceeding 170° C. and a dynamic viscosity at 180° C. and 1 sec$^{-1}$ ($\eta_1$) not exceeding 4 10$^4$ Pa s.

Furthermore, it is particularly advantageous that the ratio of the dynamic viscosities of the vinylidene chloride copolymer at 170° C. and 1 sec$^{-1}$ ($\eta_0$) and of the vinyl chloride polymer (1) forming the intermediary layer at 180° C. and 1 sec$^{-1}$ ($\eta_1$) should be within the limits 0.05 $\leq \eta_0/\eta_1 \leq 4$, preferably 0.05 $\leq \eta_0/\eta_1 \leq 2$ and, still more particularly, 0.1 $\leq \eta_0/\eta_1 \leq 2$.

The multilayer structures which are most especially preferred are consequently those in which the vinyl chloride polymer (1) forming the intermediary layer has a gel temperature not exceeding 170° C. and a dynamic viscosity at 180° C. and 1 sec$^{-1}$ ($\eta_1$) not exceeding 4 10$^4$ Pa s, the vinyl chloride polymer (2) has a gel temperature not exceeding 190° C. and a dynamic viscosity at 180° C. and 1 sec$^{-1}$ ($\eta_2$) not exceeding 2 10$^5$ Pa s, and the ratio of the dynamic viscosities $\eta_0/\eta_1$ as defined above is between 0.1 and 2.

A vinyl chloride polymer is intended to refer to all the polymers containing at least 50% and, preferably, at least 70% by weight of monomer units derived from vinyl chloride. The vinyl chloride polymers which can be employed for the production of layers (1) and (2) of multilayer structures according to the invention thus include both vinyl chloride homopolymers and its copolymers containing monomer units derived from one or more comonomers and their mixtures. As non-restrictive examples of such vinyl chloride comonomers mention may be made of olefins such as ethylene, propylene and styrene, and esters such as vinyl acetate and alkyl acrylates and methacrylates. Preference is given to vinyl chloride homopolymers.

Vinylidene chloride copolymer is intended to refer to vinylidene chloride copolymers containing from 60 to 95% by weight of vinylidene chloride, the remainder consisting of one or more ethylenically unsaturated comonomers such as, for example, vinyl chloride, acrylic and methacrylic acids and esters, and acrylic and methacrylic nitriles. Nevertheless, preference is given to binary copolymers of vinylidene chloride and vinyl chloride containing approximately 75 to 85% by weight of vinylidene chloride.

To produce the multilayer structures according to the invention use may be made of the usual methods of coextrusion through a flat or round, feed-block or multi-manifold, die. These methods are characterised in that the streams of the molten polymers forming the various layers combine and travel together in the molten state before the exit of the single die. Nevertheless, preference is given to multilayer structures coextruded through a feed-block die and, still more particularly, a flat feed-block die.

The thickness of the polymeric layers forming the multilayer complexes according to the invention, and the total thickness of the said structures is not critical and depends, of course, on the use of which they are intended and on the degree of impermeability required. To give an idea, the total thickness of the thermoplastic multilayer structures is generally between 130 and 2,500 microns and, preferably, between 180 and 2,000 microns. The thickness of the central vinylidene chloride copolymer layer is, in general, between 10 and 850 microns and, preferably, between 35 and 500 microns, and that of the intermediary layers of vinyl chloride polymer (1) providing the adhesion between 1 and 100 microns, and preferably, between 2 and 50 microns. The multilayer structure according to the invention may consequently be in the form of films, sheets, plaques, preforms and rigid or semirigid hollow bodies. They can advantageously be employed for the manufacture of packages for alimentary, pharmaceutical and cosmetic products. Stiff multilayer structures with five polymeric layers coextruded through a flat feed-block die are especially suitable for the manufacture of of packages for pharmaceutical products in the form of pills or coated pills commonly referred to as "blister".

The examples which follow are intended to illustrate the invention without, however, restricting it.

EXAMPLES

Example 1, according to the invention relates to a rigid planar thermoplastic structure with five layers ABCBA. Example 2, for comparison, relates to a rigid planar thermoplastic structure with five layers AB'C-B'A. Example 3, according to the invention, relates to a rigid planar thermoplastic structure with five layers AB"CB"A, and Example 4, also according to the invention, relates to a rigid planar thermoplastic structure with five layers AB'"CB'"A, in which:

A denotes a layer of vinyl chloride homopolymer with a thickness of 120 microns;

B denotes a layer of vinyl chloride homopolymer with a thickness of 3 microns;

B' denotes a layer of a copolymer of ethylene and vinyl acetate containing 19% by weight of vinyl acetate (sold under the tradename Escorene 00119), with a thickness of 3 microns;

B" denotes a layer of a copolymer of vinyl chloride and vinyl acetate containing 10% by weight of vinyl acetate, with a thickness of 3 microns;

B'" denotes a layer of plasticized vinyl chloride homopolymer, with a thickness of 3 microns; C denotes a layer of a copolymer of vinylidene chloride and vinyl chloride containing 22.5% by weight of vinyl chloride, with a thickness of 75 microns.

The premixes employed for the layers A, B, B", B'" and C, prepared on a fast blender, having the following weight composition:

|  | Layer A | Layer B | Layer B" | Layer B'" |
|---|---|---|---|---|
| Polyvinyl chloride, K value 58 | 100 |  |  | 100 |
| Polyvinyl chloride, K value 50 |  | 100 |  |  |
| Copolymer of vinyl chloride and vinyl acetate, K value 57 |  |  | 100 |  |
| Acrylic modifiers | 8 | 8.4 | 3 | 8.5 |
| Epoxidized soya oil | 6 | 6 | 3.2 | 6 |
| Modified calcium/zinc stabilizer | 0.14 | 0.13 | 0.5 | 0.33 |
| Aromatic phosphite |  |  | 0.3 |  |
| Dioctyl phthalate |  |  |  | 10 |
| Internal lubricant | 2.5 | 2.5 | 2 | 2 |
| External lubricants | 1.4 | 1.4 | 0.5 | 1.1 |

|  | Layer C |
|---|---|
| Vinyl chloride copolymer | 100 |
| Epoxidized stabilizer | 4 |
| Colloidal silica | 0.2 |
| External lubricant | 0.3 |

The gel temperature of the premixes is evaluated by measuring the change in the kneading torque as a function of the temperature, starting with a 60 g sample of premix (compressed under 1 kg/cm$^2$) in a Brabender plastograph conditioned at 90° C. and heated gradually to 220° C. at a rate of 4° C./min, whose kneading rods rotate at 50 revolutions/min in opposite directions. The gel temperature is the temperature at which the kneading torque varies linearly as a function of temperature.

The dynamic viscosity of the premixes is evaluated in a Mechanical Spectrometer rheometer sold by Rheometrics, which makes it possible to measure the dynamic mechanical properties of polymers from the glassy or crystalline state to the molten state. The measurements are made on pellets 2 mm in thickness and 2.5 cm in diameter taken from strips produced by kneading premixes at 150° C. for 5 min in an external Schwabenthan kneader. The measurement consists in determining the moduli $G'$ and $G''$ at a frequency of 0.16 cycle per second, that is to say for a velocity gradient of 1 sec$^{-1}$, and at a temperature of 180° C. (for vinyl chloride polymer) or 170° C. (for the vinylidene chloride copolymer). The dynamic viscosity at 180° C., or at 170° C., and 1 sec$^{-1}$ is calculated from the following formula:

$$\eta = \frac{G'^2 + G''^2}{2 \pi \nu}$$

The polyvinyl chloride-based composition forming the layers A has a gel temperature of 180° C. and a dynamic viscosity at 180° C. and 1 sec$^{-1}$ of 8 10$^4$ Pa s.

The polyvinyl chloride-based composition forming the layers B has a gel temperature of 168° C. and a dynamic viscosity at 180° C. and 1 sec$^{-1}$ of 3.1 10$^4$ Pa s.

The composition based on a copolymer of vinyl chloride and vinyl acetate forming the layers B'' has a gel temperature of 178° C. and a dynamic viscosity at 180° C. and 1 sec$^{-1}$ of 3.6 10$^4$ Pa s.

The composition based on plasticized polyvinyl chloride forming the layers B''' has a gel temperature of 152° C. and a dynamic viscosity at 180° C. and 1 sec$^{-1}$ of 1 10$^4$ Pa s.

The vinylidene chloride copolymer-based composition forming the layer C has a dynamic viscosity at 170° C. and 1 sec$^{-1}$ of 4 10$^3$ Pa s.

To manufacture the coextruded structures according to Examples 1, 2, 3 and 4, three extruders A, B, and C are arranged, feeding a special feed-block which itself feeds a flat die 26 cm in width. The heating temperatures set from the feed zone to the pumping zone are shown in Table 1. The extruders A, B and C feed the layers A, B and C (Example 1), A, B' and C (Example 2), A, B'' and C (Example 3) and A, B''' and C (Example 4) respectively of the coextruded structures. The connecting block is conditioned thermally in a first zone at 169° C. (Example 1), at 162° C. (Example 2) and at 165° C. (Examples 3 and 4) respectively, and in a second zone at 172° C. (Example 1), at 175° C. (Example 2) and at 170° C. (Examples 3 and 4) respectively. The flat die is conditioned thermally at 185° C. The exit slit is fixed at 0.5 mm. The planar coextruded structure is drawn from the die exit by means of a polishing calender whose rolls are conditioned thermally at 90° C.

After cooling to ambient temperature, the adhesion (delamination resistance) is evaluated in a Frank type 650 tensometer using a method closely related to the standard ASTM D 1876-72. The adhesion is also evaluated after the multilayer structures have been immersed for 60 minutes in boiling water and have then been dried for one hour at 20° C.

An organic solvent was needed to initiate the delamination of the multilayer structures according to Examples 1, 3 and 4, both before and after residence in boiling water. This was not the case for the multilayer structure according to Example 2, for comparison, in which delamination was initiated without difficulty and without having to make use of a solvent. In the case of Examples 3 and 4, it was impossible to measure the adhesion because breakage occurred in the region of the polyvinyl chloride layers (2) during the measurement.

The results of the evaluation of adhesion are given in Table 2.

TABLE 1

| Example No. | Temperatures (°C.) set on the extruders from the feed zone to the pumping zone | | |
|---|---|---|---|
| | Extruder A | Extruder B | Extruder C |
| 1 | 160 175 171 172 | 168 174 | 150 155 155 155 |
| 2 | 160 175 171 172 | 155 160 | 150 155 155 155 |
| 3 | 160 175 171 172 | 150 165 | 150 155 155 155 |
| 4 | 160 175 171 172 | 160 170 | 150 155 155 155 |

TABLE 2

| Example No. | Adhesion, newton/cm | |
|---|---|---|
| | Before residence in boiling water | After residence in boiling water |
| 1 | 11.40 | 11.00 |
| 2 | 1.08 | 0.17 |
| 3 | not measurable | |
| 4 | not measurable | |

We claim:

1. A rigid or semirigid thermoplastic structure comprising
   multiple coextruded polymeric layers,
   an inner vinylidene chloride copolymer layer,
   vinyl chloride polymer layers having a gel temperature not exceeding about 190° C. and a dynamic viscosity at 180° C. and 1 sec$^{-1}$ not exceeding about 2 10$^5$ Pa s, and
   separate adhesive layers of vinyl chloride polymer, wherein each face of said inner vinylidene chloride copolymer layer is bonded to one said vinyl chloride polymer layer by means of one adhesive layer and the vinyl chloride polymer of said one adhesive layer has a gel temperature and a dynamic viscosity at 180° C. and 1 sec$^{-1}$ lower than the gel temperature and the dynamic viscosity of the vinyl chloride polymer of its adjacent layer under the same conditions.

2. The rigid or semirigid thermoplastic structure according to claim 1, wherein
   the vinyl chloride polymer of the adhesive layers has a gel temperature not exceeding about 180° C. and a dynamic viscosity at 180° C. and 1 sec$^{-1}$ not exceeding about 8 10$^4$ Pa s.

3. The rigid or semirigid thermoplastic structure according to claim 2, wherein
   the vinyl chloride polymer of the adhesive layers has a gel temperature not exceeding about 170° C. and a dynamic viscosity at 180° C. and 1 sec$^{-1}$ not exceeding about 4 10$^4$ Pa s.

4. The rigid or semirigid thermoplastic structure according to claim 1, wherein
   the ratio of the dynamic viscosities of the vinylidene chloride copolymer at 170° C. and 1 sec$^{-1}$ ($\eta_0$) and of the vinyl chloride polymer adhesive at 180° C. and 1 sec$^{-1}$ ($\eta_1$) is within the limits of about $0.05 \leq \eta_0/\eta_1 \leq 2$.

5. The rigid or semirigid thermoplastic structure according to claim 4, wherein
   the ratio $\eta_0/\eta_1$ is within the limits of about $0.1 \leq \eta_0/\eta_1 \leq 2$.

6. The rigid or semirigid thermoplastic structure according to claim 1 produced by a process of coextrusion through a feed-block die.

7. The rigid or semirigid thermoplastic structure according to claim 6 produced by a process of coextrusion through a flat feed-block die.

8. The rigid or semirigid thermoplastic structure according to claim 1 constituting a package for alimentary, pharmaceutical or cosmetic products.

9. The rigid or semirigid thermoplastic structure according to claim 7 constituting a package for pharmaceutical pills or coated tablets.

* * * * *